UNITED STATES PATENT OFFICE.

LOUIS BLANGEY, OF MANNHEIM, GERMANY, ASSIGNOR TO BADISCHE ANILIN & SODA FABRIK, OF LUDWIGSHAFEN-ON-THE-RHINE, GERMANY.

DINITRO-DIAMINO-BENZOPHENONE.

1,104,611.

Specification of Letters Patent. Patented July 21, 1914.

No Drawing. Application filed February 26, 1914. Serial No. 821,206.

*To all whom it may concern:*

Be it known that I, LOUIS BLANGEY, Ph. D., citizen of the Swiss Republic, residing at Mannheim, Germany, have invented new and useful Improvements in Dinitro-Diamino-Benzophenone, of which the following is a specification.

I have discovered a new compound which is dinitro-diamino-benzophenone, which possesses a constitution corresponding to the formula:—

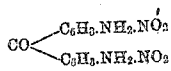

and which is characterized by the following properties:—It possesses an orange to yellow color, melts when pure at about 292° C., is insoluble in dilute hydrochloric acid, very difficultly soluble in alcohol, ether and benzene, and easily soluble in boiling cresol. On reduction with stannous chlorid it gives rise to a body, which in the pure state melts at about 213–214° C. and gives a colorless solution in concentrated sulfuric acid.

My new compound can be obtained by dinitrating 4.4′-dichlor-benzophenone and then heating the product with ammonia. If the heating with ammonia be carried out in the presence of alcohol, I obtain practically pure dinitro-diamino-benzophenone, whereas if the reaction be carried out in the presence of water a mixture of dinitro-diamino-benzophenone with dinitro-amino-chlor-benzophenone is produced. My new compound, dinitro-diamino-benzophenone, is suitable for use as a pigment, both by itself and also in the form of a mixture with dinitro-amino-chlor-benzophenone, and I wish to be understood as claiming my new dinitro-diamino-benzophenone both by itself and also in admixture with other compounds.

The following examples will serve to illustrate how I can obtain my new compound from 4.4′ dichlor-benzophenone. The parts are by weight.

Example 1: Dissolve 6.275 parts of pure 4.4′ dichlor-benzophenone in 25 parts of 97% sulfuric acid at ordinary temperature, and then add, during a period of from 2 to 3 hours, 7.25 parts of nitrating acid containing 44½% of nitric acid. During the addition maintain the temperature at from 0° to 10° C. Then stir for from 3 to 4 hours and pour the mixture on to ice, filter off the precipitate, wash it well and dry it. In this way a good yield of dinitro-dichlor-benzophenone is obtained.

Example 2: Heat together in an autoclave for 10 hours at from 150–160° C. 1 part of dinitro-dichlor-benzophenone, obtained according to the foregoing example, and 5 parts of alcoholic ammonia containing 10% $NH_3$. When the mixture is cold, filter off the precipitate, wash it with water and dry it. It consists of almost pure dinitro-diamino-benzophenone and melts at about 289–290° C. If in this example the alcoholic ammonia be replaced by 2 parts of 20% aqueous ammonia and 2½ parts of water and the heating be carried out for 5 hours at from 140–145° C., a mixture of dinitro-diamino-benzophenone with dinitro-amino-chlor-benzophenone is obtained.

Now what I claim is:—

The new dinitro-diamino-benzophenone which possesses an orange to yellow color, melts in the pure state at about 292° C. is insoluble in dilute hydrochloric acid, very difficultly soluble in alcohol, ether and benzene, easily soluble in boiling cresol and on reduction with stannous chlorid gives rise to a product which melts at from 213–214° C. and yields a colorless solution in concentrated sulfuric acid.

In testimony whereof I have hereunto set my hand in the presence of two subscribing witnesses.

LOUIS BLANGEY.

Witnesses:
J. ALEC. LLOYD,
S. S. BERGER.